(12) United States Patent
Bruenle et al.

(10) Patent No.: US 7,356,037 B1
(45) Date of Patent: Apr. 8, 2008

(54) TELECOMMUNICATION SYSTEM AND METHOD FOR TRANSMITTING DATA

(75) Inventors: Siegfried Bruenle, Kaesbuehlstrasse (DE); Juergen Fischer, Backnang (DE)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 09/857,821

(22) PCT Filed: Feb. 10, 1999

(86) PCT No.: PCT/DE99/03200

§ 371 (c)(1),
(2), (4) Date: Sep. 10, 2001

(87) PCT Pub. No.: WO00/36864

PCT Pub. Date: Jun. 22, 2000

(30) Foreign Application Priority Data

Dec. 12, 1998 (DE) ................... 198 57 406

(51) Int. Cl.
*H04L 12/28* (2006.01)
(52) U.S. Cl. .............. 370/401; 370/338; 370/468
(58) Field of Classification Search ........... 370/328, 370/401, 219, 264
See application file for complete search history.

(56) References Cited

U.S. PATENT DOCUMENTS

| | | | |
|---|---|---|---|
| 5,381,413 A * | 1/1995 | Tobagi et al. | 370/448 |
| 5,490,136 A * | 2/1996 | Sereno et al. | 370/342 |
| 5,751,702 A | 5/1998 | Evans et al. | |
| 6,049,535 A * | 4/2000 | Ozukturk et al. | 370/335 |
| 6,052,408 A * | 4/2000 | Trompower et al. | 375/141 |
| 6,115,370 A * | 9/2000 | Struhsaker et al. | 370/342 |
| 6,240,091 B1 * | 5/2001 | Ginzboorg et al. | 370/401 |
| 6,259,676 B1 * | 7/2001 | Kellock et al. | 370/248 |
| 6,307,867 B1 * | 10/2001 | Roobol et al. | 370/470 |
| 6,370,243 B2 * | 4/2002 | Tiihonen et al. | 379/219 |
| 6,370,359 B1 * | 4/2002 | Ue et al. | 455/69 |
| 6,374,112 B1 * | 4/2002 | Widegren et al. | 455/452.2 |
| 6,556,549 B1 * | 4/2003 | Bender et al. | 370/328 |
| 6,594,238 B1 * | 7/2003 | Wallentin et al. | 370/252 |
| 6,721,306 B1 * | 4/2004 | Farris et al. | 370/352 |

FOREIGN PATENT DOCUMENTS

| | | |
|---|---|---|
| EP | 0 713 347 A2 | 5/1996 |
| EP | 0 719 062 A3 | 6/1996 |
| EP | 0 732 826 A2 | 9/1996 |
| WO | WO 98/24224 | 6/1998 |

* cited by examiner

*Primary Examiner*—Duc Ho
(74) *Attorney, Agent, or Firm*—Kirschstein, et al.

(57) ABSTRACT

A telecommunication system includes a base station, a router allocated to the base station, and several subscriber stations that are connected to the base station via an access network. Subscriber station routers set up a telecommunication link with the base station router. The base station router controls the variable transfer rates that are allocated to a telecommunication link between the base station and the subscriber station. The access network is only loaded with the transfer bandwidth that is actually required for data transmission.

16 Claims, 1 Drawing Sheet

TELECOMMUNICATION SYSTEM AND METHOD FOR TRANSMITTING DATA

BACKGROUND OF THE INVENTION

The invention relates to a telecommunication system and method to transmit data.

DESCRIPTION OF THE RELATED ART

For data traffic, for example Internet access by means of TCP/IP Protocol (Transmission Control Protocol/Internet Protocol) between a base station of a network operator and a subscriber station, routers are used at both ends of the telecommunication connection, which require permanently allocated transmission capacity, so called Leased Lines of 2 Mbit/s for example. In the case of the subscriber station this may be the communication link of a company or for instance of a multi-residence building. In any case several analogue or digital terminals for speech and/or data communication can be connected to the subscriber station. The data between base station and subscriber station can in this case be transmitted via a fixed copper or glass fibre network or via a radio link.

However with data traffic, greater fluctuations of the data flow can occur than is the case with speech traffic. Should for example a large data file be downloaded from the Internet or transferred via an Intranet, a high transmission bandwidth is required for the telecommunication link so that the data can be transmitted within a time acceptable to the user. At the moment, if such data transfer does not take place, then the necessary transmission bandwidth on the contrary is low. In providing the transmission bandwidth for the telecommunication connection therefore either costly over-capacities result, or in the case of heavy demand congestion occurs.

SUMMARY OF THE INVENTION

The telecommunication system according to the invention and the method according to the invention to transmit data have the advantage, due to variable transmission capacity of the individual transmission lines, of enabling the actual amount of data traffic to be dynamically adjusted. As a result an existing network infrastructure can be used better and more efficiently and at the same time an increased quality of service can be provided even at the time of heavy demand. This means that with an increased maximum data transmission rate per subscriber a greater number of subscriber stations can be served at the same time by the base station.

The advantages are achieved through a telecommunication system and method to transmit data with a base station, a base station-router allocated to the base station, several subscriber stations connected via a network with the base station, with subscriber station-routers to create a telecommunication connection with the base station-router, whereby the base station-router controls the variable transmission rates of the data signals in each case allocated to a telecommunication link between base station and subscriber station. In this case the base station-router takes on the same role as switching stations fulfil in speech traffic.

Preferably the base station-router can be dialled up by the subscriber station-router to create a connection between base station and subscriber station. Dialling is preferably via an ISDN primary multiplex connection (PRA).

Preferably the base station is connected with the base station-router via an interface with V5.2 protocol. An interface of this type has the advantage of enabling the particular transmission capacity to be allocated and assigned to the individual data connections.

Preferably the base station has a separate interface for speech communication which for example works with V5 protocol. This interface can be connected to an external telecommunication network for speech transmission. This architecture results in the fact that the data traffic (IP protocol) is separate from the speech communication and thus dialled connections are not blocked by high data streams arising from the data connection.

Preferably the transmission rate between the base station and a subscriber station can be variably selected in steps of 64 kbit/s for example.

The base station-router can have several 2 Mbit/s interfaces and/or an Ethernet interface to an external communication network, such as for example an Internet Service Provider.

The data can be transmitted between base station and a subscriber station in this case for example by means of the ITU-G.704 protocol via an HDSL connection over a fixed network or by radio.

Preferably at the subscriber station-router there is an Ethernet interface to connect to LAN (Local Area Network) terminals. The subscriber station preferably has further interfaces for speech communication (U, S0, a/b) and Leased Lines (LL).

BRIEF DESCRIPTION OF THE DRAWING

The invention is explained in detail below using embodiment examples together with the attached drawing, which shows a schematic block circuit diagram for a configuration of the telecommunication system according to the invention.

DETAILED DESCRIPTION OF THE PREFERRED EMBODIMENTS

Figure 1:
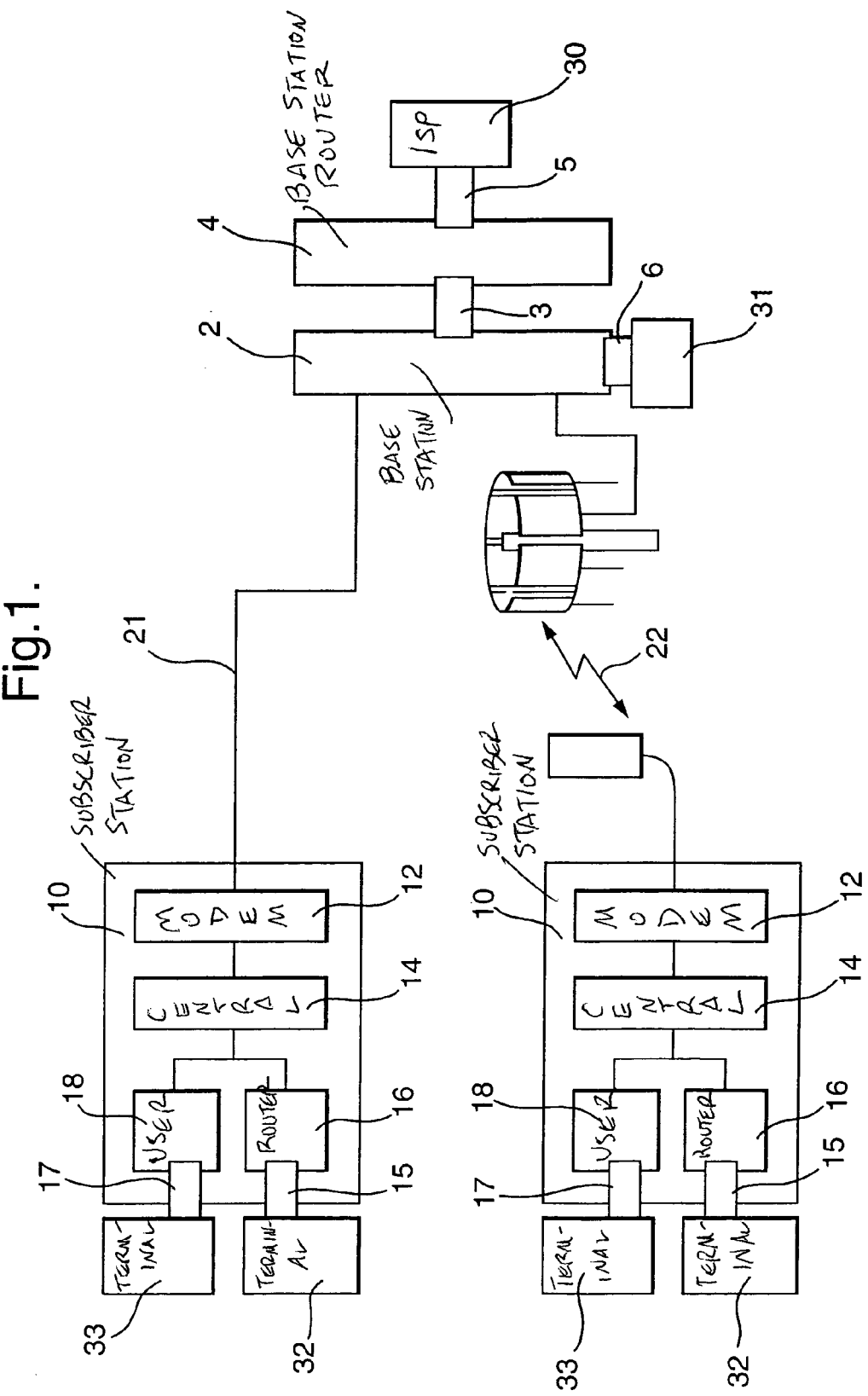

The single FIGURE shows in a schematic block circuit diagram a typical configuration of the telecommunication system according to the invention.

The central part of the configuration is a base station 2, which is coupled via an interface 3 with at least one base station-router 4. The base station 2, also called Central Distribution Node, is a central data-processing and computer unit to control a variety of incoming and outgoing connections. A unit of the MSV5 type can be used as base station 2.

In the FIGURE on the left hand side two subscriber stations 10 can be seen illustrated by way of example. In each case these have a modem 12 or similar to connect to a telecommunication connection 21, 22, a central unit 14, a user unit 18 as well as a subscriber station-router 16. The user unit 18 has a speech communication interface 17, to which analogue as well as digital terminals such as telephones, fax machines or similar can be connected (U, S0, a/b and LL interfaces). The subscriber station-router 16 possesses an Ethernet interface 15 which provides connection to LAN (Local Area Network) terminals such as networked PCs or similar.

The connection network between base station 2 and the subscriber stations 10 can, as illustrated schematically in the FIGURE, be created via fixed network 21 or by radio connection 22. This can be a 2 Mbit/s connection in accordance with the G.704 general structure of the International Telecommunication Union (ITU), an SDH (Synchronous Digital Hierarchy) network or a point-to-multipoint radio connection of the DMS type (Digital Multiport System).

The base station 2 is connected via the interface 3 with the base station-router 4. This has the function of controlling the data connection to the subscriber station-routers 16 contained in the subscriber stations 10. The interface 3 preferably consists of a number of 2 Mbit/s interfaces in accordance with protocol V5.2 according to ETS 300 347 corresponding to ITU G.965. Up till now only interfaces, which work with this protocol, have been used for analogue and ISDN connections. The use of such an interface for the base station-router 4 allows the capacity of the data connection between base station and subscriber stations to be controlled in a similar way to speech connection, for example in 64 kbit/s steps between a minimum capacity of 64 kbit/s and a maximum capacity of 2 Mbit/s for each data connection. The respective 64 kbit/s time slots of a 2 Mbit/s connection can be distributed individually and dynamically to the lines to the respective subscriber stations 10 by means of the base station-router 4.

The base station-router 4 behaves identically as for example an ISDN connection in regard to the band width allocation. The 64 kbit/s time slot is built up or dismantled corresponding to the build-up or dismantling of an ISDN channel. Within the system the traffic between base station-router 4 and subscriber station-router 16 behaves just like ISDN traffic. Through the use of the V5.2 protocol the base station-router also has a concentration function. Thus it is possible, for example, to connect 100 subscriber station-routers 16 to one base station-router. Although the base station-router 4 has for example only 4×2-Mbit/s interfaces to supply the subscriber stations, nevertheless each of the 100 subscriber station-routers 16 can, for a short period, have a maximum capacity of 30×64 kbit/s, as a result of which large quantities of data can also be transferred rapidly. As a result of this concentration function by the base station-router 4 any capacity being carried away to the POP (Point of Presence) is minimized.

The architecture of the telecommunication system according to the invention means that only the actual transmission rate needed is made available each time on demand by the network as a result of function of the base station router 4 connected via the V5.2 interface with the base station 2 in the case of an ISDN primary multiplex connection (PRA) to the respective subscriber station-router 16. Compared to previous usual connections for data traffic with fixed transmission capacity (Leased Lines) this gives much greater flexibility and results in more cost effective use of the line as well as the switching resources.

With this architecture the mechanisms of ISDN-PRA with V5.2 are used to create the connection between a subscriber station-router 16 and the base station-router 4 and vice-versa, that is to say the subscriber station-router is switched via ISDN-PRA in the D-channel, which is transmitted transparently within the connection network, to the base station-router. The V5-module in the base station-router causes the base station 2 to change to the desired transmission capacity. The data streams according to the Internet Protocol (IP) are transmitted transparently through the connection network 21, 22.

Preferably the base station 2 has a separate interface 6, for example a V5 interface to connect to a telephone network for speech communication. The base station-router 4 can again be connected via an Ethernet interface 5 to an Internet Service Provider 30. As a result the IP data streams are fed independently of the interface 6 for speech communication directly via the base station router 4 into the IP network. Consequently it is ensured that the interface 6 designed for dial-up connections is not blocked by the IP data streams.

The telecommunication system and method to transmit data according to the invention can make available the transmission capacity for a data connection between base station and subscriber station required at this particular moment, for example by using a DBA (Dynamic Bandwidth Allocation) algorithm. The available transmission bandwidth, for example on beamed radio links, is used more efficiently and more cost effectively as a result. The separation of data traffic and speech communication in the base station relieves the interface 6 to the telephone network of the IP data streams.

The invention claimed is:

1. A telecommunication system, comprising:
   a) a base station;
   b) at least one base station-router allocated to the base station;
   c) several subscriber stations with respective subscriber station-routers connected via a connection network at variable transmission rates with the base station, for creating a telecommunication link with said at least one base station-router; and
   d) said at least one base station-router being operative for dynamically controlling and concentrating the variable transmission rate dynamically allocated to each telecommunication link between the base station and each subscriber station, the dynamically allocated transmission rate being dynamically assigned to the subscriber stations in accordance with bandwidth available between the base station and the at least one base station-router.

2. The telecommunication system according to claim 1, wherein said at least one base station-router dials a respective subscriber station-router to create a connection between the base station and the respective subscriber station.

3. The telecommunication system according to claim 2, wherein said at least one base station-router is operative for dialing via an ISDN primary multiplex connection.

4. The telecommunication system according to claim 1, wherein the base station is connected with said at least one base station-router via an interface with V5.2 protocol.

5. The telecommunication system according to claim 2, wherein the base station has a separate interface for speech communication.

6. The telecommunication system according to claim 5, wherein the separate interface works with V5-protocol.

7. The telecommunication system according to claim 1, wherein the variable transmission rate between the base station and each subscriber station varies in steps of 64 kbit/s.

8. The telecommunication system according to claim 1, wherein said at least one base station-router has several 2 Mbit/s interfaces and/or an Ethernet interface to an external communication network.

9. The telecommunication system according to claim 1, wherein data is transmitted between the base station and each subscriber station by means of the G.704 general structure of the International Telecommunication Union.

10. The telecommunication system according to claim 1, wherein data is transmitted between the base station and each subscriber station by means of radio transmission signals, and wherein the radio transmission signals are concentrated in air from a point-to-multipoint system.

11. The telecommunication system according to claim 1, wherein data is transmitted between the base station and each subscriber station via a light-wave conductor.

12. The telecommunication system according to claim 1, wherein data is transmitted between the base station and each subscriber station via an HDSL-connection.

13. The telecommunication system according to claim 1, wherein data is transmitted between the base station and each subscriber station via a synchronous digital hierarchy connection.

14. The telecommunication system according to claim 1, wherein an Ethernet interface is located at each subscriber station-router.

15. The telecommunication system according to claim 1, wherein interfaces for speech communication are present at the subscriber stations.

16. A method of transmitting data between a base station and several subscriber stations, comprising the steps of:
   a) allocating the base station to a base station-router;
   b) dynamically allocating several subscriber stations to respective subscriber station-routers to create a telecommunication link with the base station-router; and
   c) controlling and concentrating a variable data transmission rate dynamically allocated to each telecommunication link between the base station and each subscriber station, the dynamically allocated transmission rate being dynamically assigned to the subscriber stations in accordance with bandwidth available between the base station and the base station-router.

* * * * *